United States Patent [19]
Khoury et al.

[11] Patent Number: 5,987,347
[45] Date of Patent: Nov. 16, 1999

[54] METHOD FOR REMOVING STREAK ARTIFACTS IN MEDICAL IMAGES

[75] Inventors: Issa Y. Khoury, Waukesha; Gopal B. Avinash, New Berlin, both of Wis.

[73] Assignee: General Electric Company, Milwaukee, Wis.

[21] Appl. No.: 08/990,826

[22] Filed: Dec. 15, 1997

[51] Int. Cl.$^6$ .................................................... A61B 5/055
[52] U.S. Cl. ...................... 600/410; 378/901; 382/131; 600/425
[58] Field of Search ................................. 600/407, 410, 600/419, 425; 324/309, 306, 307; 378/901, 4; 382/131; 128/922

[56] References Cited

PUBLICATIONS

Adaptive Fourier Threshold Filtering: A Method to Reduce Noise and Incoherent Artifacts in High Resolution Cardiac Images, Doyle, et al., MRM 31:546–550 (1994).
A Thesis: Towards Adaptive Filtration Of Two Dimensional Time–of–Flight Magnetic Resonance Angiography Data, I.Y. Khoury, May 1997.
13.10 Wavelet Transforms, Fourier and Spatial Applications, Ch. 13, pp. 591–606.
Annals of Biomedical Engineering, BMES Abstracts: Imaging, vol. 21, Supp. 1, 1993.
Annals of Biomedical Engineering, 1994 Annual Fall Meeting.
Orthonormal Bases of Compactly Supported Wavelets, Communications on Pure and Applied Mathematics, vol. XLI 909–996 (1988) I. Daubechies.

*Primary Examiner*—George Manuel
*Assistant Examiner*—Shawna J. Shaw
*Attorney, Agent, or Firm*—Quarles & Brady; Christian G. Cabou; Phyllis Y. Price

[57] ABSTRACT

An MRI system acquires medical images that may contain streak artifacts. A filtered copy of the acquired image is compared with the acquired image to locate rows containing streak artifacts. Located rows in the acquired image are replaced with filtered rows to remove streak artifacts without affecting the rest of the acquired medical image.

12 Claims, 3 Drawing Sheets

METHOD FOR REMOVING STREAK ARTIFACTS IN MEDICAL IMAGES

BACKGROUND OF THE INVENTION

The field of the invention is medical imaging, and particularly, the filtering and enhancement of medical images to improve their visual quality.

The quality of medical images is a function of the imaging modality used and the particular method used to acquire the image data. As a general matter, regardless of the imaging modality used, the quality of medical images can be improved by acquiring redundant data which can be averaged to reduce the effects of random noise. Unfortunately, this solution results in an increased scan time that inconveniences the patient and is expensive. Another approach is to increase the power of the imaging system. In MRI this may take the form of a stronger polarizing field (e.g. 1.5 Tesla instead of 0.5 Tesla), in x-ray systems this can take the form of a higher power x-ray beam, and in ultrasound this may take the form of a more powerful rf amplifier and transducer. These measures drive up the cost of the equipment, and in the case of x-ray, increase the dose of ionizing radiation to the patient.

In addition to random noise, image artifacts can be produced in medical images due to corrupted data acquired during the scan of a patient or due to imperfections in the image reconstruction process. Artifacts produced in the image can take many forms such as streaks, blurring, ghosts and distortion, and will depend on the cause of the artifact and the particular imaging modality used.

A very common cause of image artifacts in medical images, for example, is patient movement during the scan. Numerous methods are used to eliminate such motion artifacts, such as immobilizing the patient, shortening the scan time, cardiac and respiratory gating and breath holding. In other words, there are many methods used to deal with the cause of motion artifacts so that they are reduced or even eliminated.

Unfortunately, there are circumstances in which patient motion will inevitably occur and artifacts will be produced. For example, patient swallowing or subtle movements during a magnetic resonance angiography (MRA) exam of the carotid arteries using a 2D time-of-flight (TOF) pulse sequence can produce streak artifacts in an image reconstructed using a maximum intensity pixel (MIP) projection method. As shown in FIG. 2, such streaks reduce the clinical usefulness of the image and may require that the scan be repeated. Such re-scanning is costly and it is inconvenient and uncomfortable for the patient. In situations where the patient is unable to cooperate in remaining motionless, producing good quality images becomes very problematic with some imaging procedures.

SUMMARY OF THE INVENTION

The present invention is a method for filtering medical images to remove streaking artifacts in which each row of the image is examined to locate rows containing streak artifacts and these rows are replaced with a row of data that does not have a streak artifact. In one embodiment, a copy of the medical image is filtered to reduce streak artifacts, the filtered image is compared with the original medical image to locate the rows of pixels containing streak artifacts; and the located rows in the original medical image are replaced with unstreaked rows derived from the filtered copy. In another embodiment the projection of each row in the image is calculated and each projection value is compared with the projection value of adjacent rows to locate rows containing streak artifacts.

A general object of the invention is to remove streak artifacts from medical images without blurring, or otherwise changing the medical image. Those rows in the image containing streaks are located. Only the rows containing detected streaks are changed, thus leaving other portions of the medical image in its original, unfiltered form. In this manner, streaks can be located with very aggressive filtering without affecting the clinical value of the medical image.

Another object of the invention is to enable the user to control the aggressiveness with which streak artifacts are removed. The number of rows to be replaced can be input by the user and the process will replace that number of rows starting with the most intense streaks and working down. Since the entire process only requires a few seconds to complete, the user can interactively change the number until all the objectionable streaks are removed.

DESCRIPTION OF THE PREFERRED EMBODIMENTS

Figure 1:
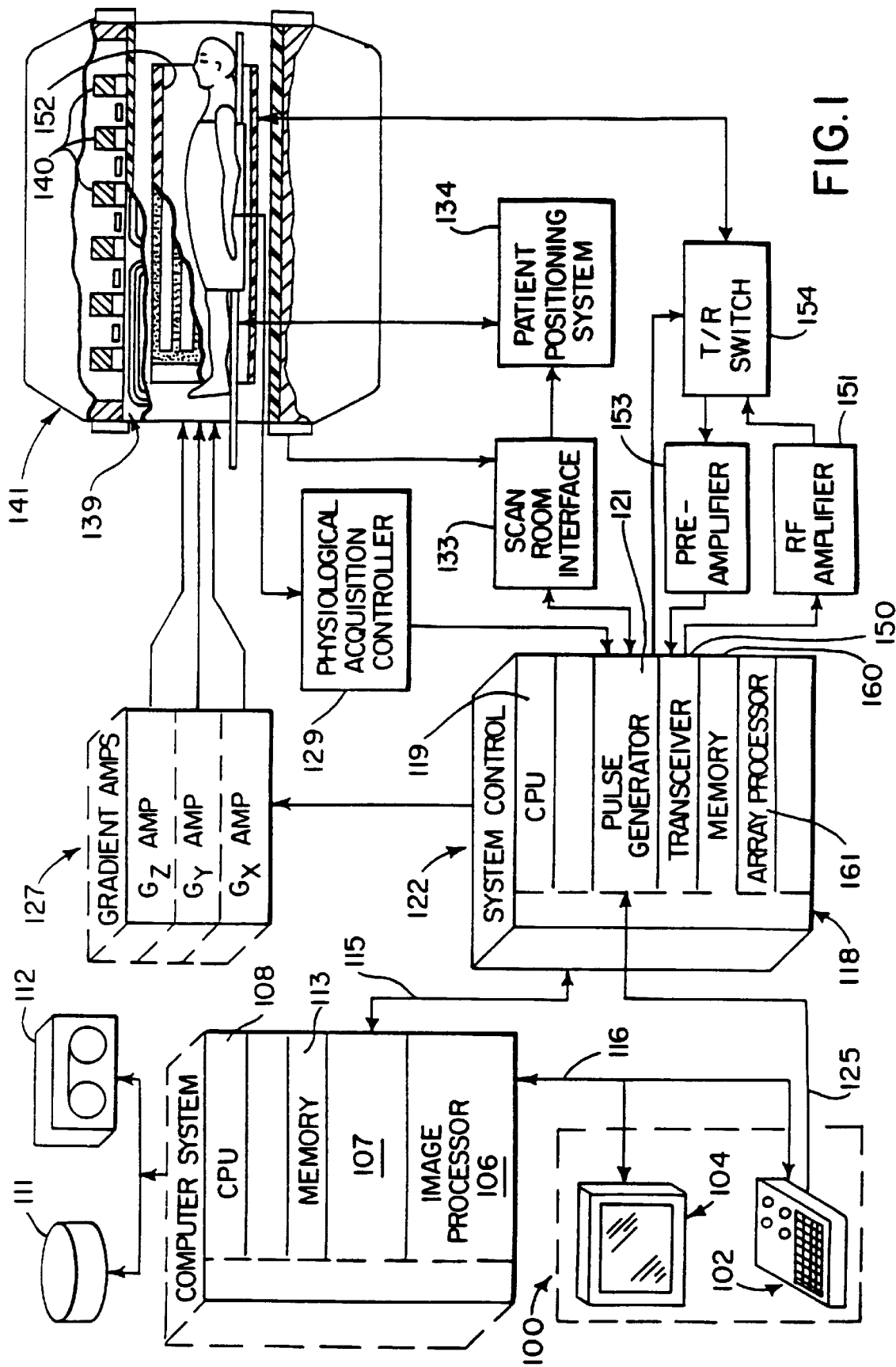
FIG. 1 is a block diagram of an MRI system which employs the present invention.

Referring first to FIG. 1, there is shown the major components of a preferred MRI system which incorporates the present invention. The operation of the system is controlled from an operator console 100 which includes a keyboard and control panel 102 and a display 104. The console 100 communicates through a link 116 with a separate computer system 107 that enables an operator to control the production and display of images on the screen 104. The computer system 107 includes a number of modules which communicate with each other through a backplane. These include an image processor module 106, a CPU module 108 and a memory module 113, known in the art as a frame buffer for storing image data arrays. The computer system 107 is linked to a disk storage 111 and a tape drive 112 for storage of image data and programs, and it communicates with a separate system control 122 through a high speed serial link 115.

The system control 122 includes a set of modules connected together by a backplane. These include a CPU module 119 and a pulse generator module 121 which connects to the operator console 100 through a serial link 125. It is through this link 125 that the system control 122 receives commands from the operator which indicate the scan sequence that is to be performed. The pulse generator module 121 operates the system components to carry out the desired scan sequence. It produces data which indicates the timing, strength and shape of the RF pulses which are to be produced, and the timing of and length of the data acquisition window. The pulse generator module 121 connects to a set of gradient amplifiers 127, to indicate the timing and shape of the gradient pulses to be produced during the scan. The pulse generator module 121 also receives patient data from a physiological acquisition controller 129 that receives signals from a number of different sensors connected to the patient, such as ECG signals from electrodes or respiratory signals from a bellows. And finally, the pulse generator module 121 connects to a scan room interface circuit 133 which receives signals from various sensors associated with the condition of the patient and the magnet system. It is also through the scan room interface circuit 133 that a patient positioning system 134 receives commands to move the patient to the desired position for the scan.

The gradient waveforms produced by the pulse generator module 121 are applied to a gradient amplifier system 127 comprised of $G_x$, $G_y$ and $G_z$ amplifiers. Each gradient amplifier excites a corresponding gradient coil in an assembly generally designated 139 to produce the magnetic field gradients used for position encoding acquired signals. The gradient coil assembly 139 forms part of a magnet assembly 141 which includes a polarizing magnet 140 and a whole-body RF coil 152. A transceiver module 150 in the system control 122 produces pulses which are amplified by an RF amplifier 151 and coupled to the RF coil 152 by a transmit/receive switch 154. The resulting signals radiated by the excited nuclei in the patient may be sensed by the same RF coil 152 and coupled through the transmit/receive switch 154 to a preamplifier 153. The amplified NMR signals are demodulated, filtered, and digitized in the receiver section of the transceiver 150. The transmit/receive switch 154 is controlled by a signal from the pulse generator module 121 to electrically connect the RF amplifier 151 to the coil 152 during the transmit mode and to connect the preamplifier 153 during the receive mode. The transmit/receive switch 154 also enables a separate RF coil (for example, a head coil or surface coil) to be used in either the transmit or receive mode.

The NMR signals picked up by the RF coil 152 are digitized by the transceiver module 150 and transferred to a memory module 160 in the system control 122. When the scan is completed and an entire array of data has been acquired in the memory module 160, an array processor 161 operates to Fourier transform the data into an array of image data. This image data is conveyed through the serial link 115 to the computer system 107 where it is stored in the disk memory 111. In response to commands received from the operator console 100, this image data may be archived on the tape drive 112, or it may be further processed by the image processor 106 in accordance with the present invention and conveyed to the operator console 100 and presented on the display 104.

For a more detailed description of the transceiver 150, reference is made to U.S. Pat. Nos. 4,952,877 and 4,922,736 which are incorporated herein by reference.

Figure 2:
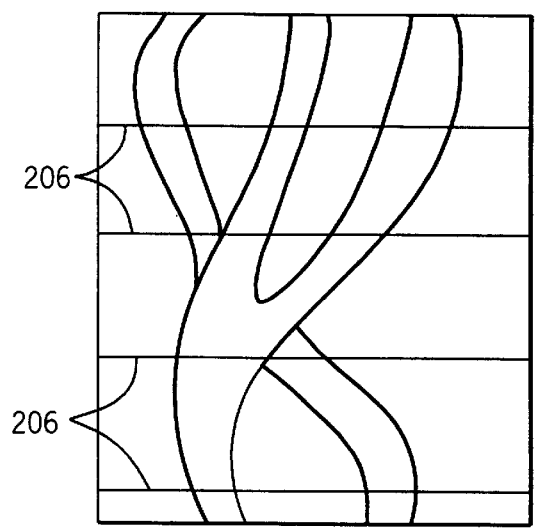
FIG. 2 is an exemplary medical image containing streak artifacts.
Figure 3:
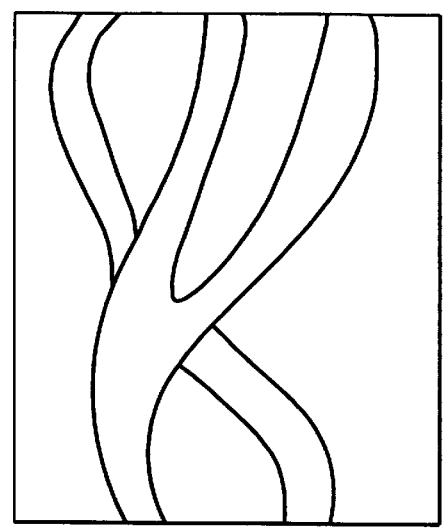
FIG. 3 is the medical image of FIG. 2 with the streak artifacts removed using the filter method of the present invention.
Figure 4:
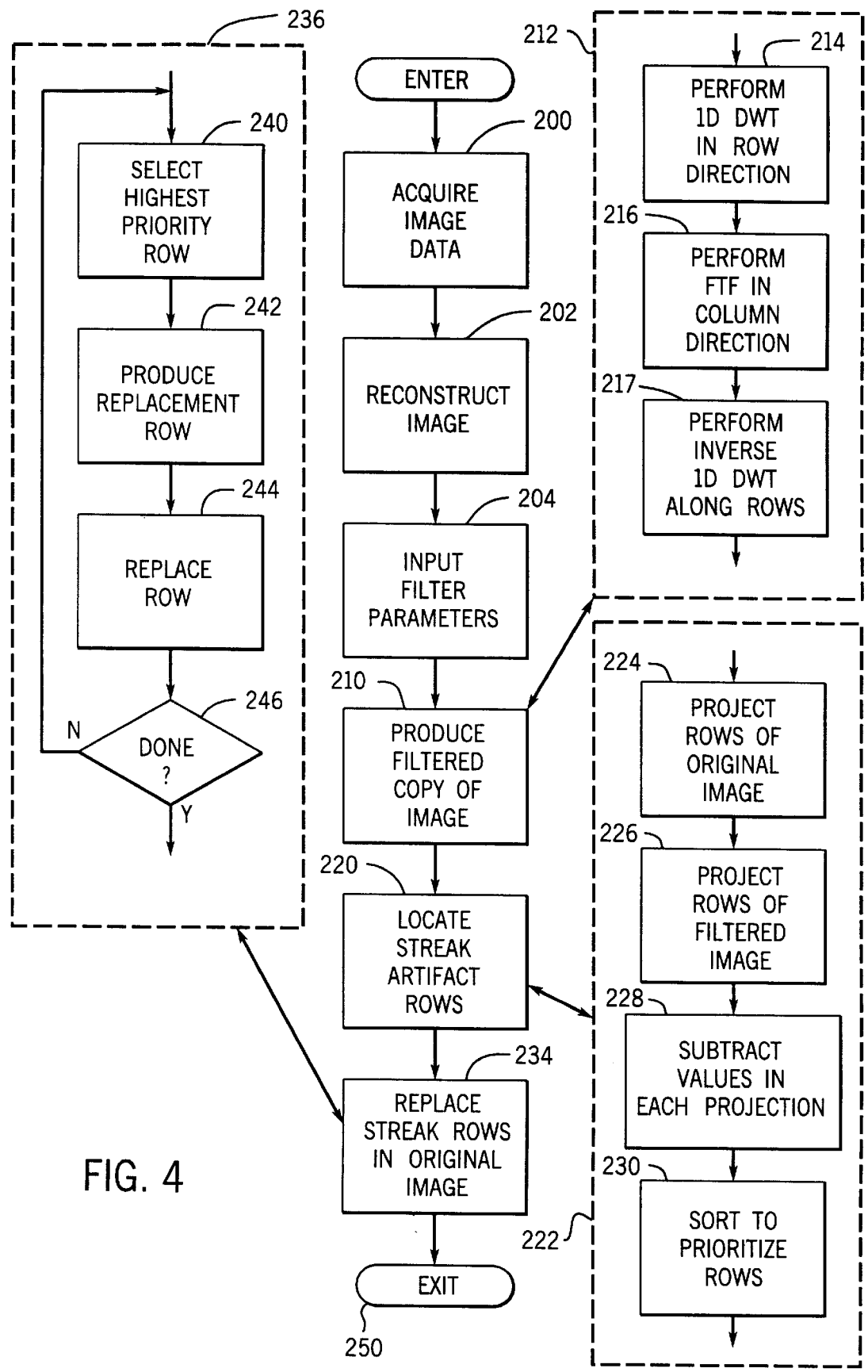
FIG. 4 is a flow chart of the process performed by the MRI system of FIG. 1 to practice the preferred embodiment of the invention.

The present invention is implemented in the image processor 106 shown in FIG. 1 by carrying out the sequence of steps indicated by the flow chart in FIG. 4. As indicated at process block 200, the first step is to acquire the image using the above-described MRI system and an appropriate pulse sequence. The image is then reconstructed as indicated at process block 202 and stored in the computer system 107 as an array of pixel intensity values arranged in rows and columns. An operator may retrieve this stored image at the console 100, where it can be viewed on display 104. As indicated at process block 204, the operator is prompted to input filter parameters which direct the type and intensity of the filtering desired on the medical image. The present invention is a process for removing streaks from the image, such as those shown at 206 in FIG. 2. A predetermined number of rows can be automatically selected, but in the preferred embodiment the operator selects a number which indicates the number of rows of pixels (i.e. horizontal lines) to be replaced. This number should correspond roughly with the number of observed streaks in the medical image, but one of the advantages of the present invention is that because the processing time is so short, the operator may try progressively higher numbers until the objectionable streaks are sufficiently eliminated.

Referring again to FIG. 4, the next step in the process is to filter a copy of the original medical image as indicated at process block 210. The objective of this filtering step 210 is to significantly reduce, or remove the streak artifacts 206 from the image. There are many filters which can accomplish this, but in the preferred embodiment a three step filter indicated by lines 212 is employed. As a first step 214 a one-dimensional (1D) discrete wavelet transform (DWT), such as that described by W. H. Press, S. A. Teukolsky, W. T. Vetterling, B. P. Flannery, *Numerical Recipes in C*, page 591, Cambridge University Press, New York, 1992; and Daubechies, "Orthogonal Bases of Compactly Supported Wavelets," Communications on Pure and Applied Mathematics, Vol. 41, pp. 909–996, 1988, is performed along the row direction of the medical image. As indicated at process block 216, this is followed by performing a Fourier threshold filtering (FTF) operation, such as that described by M. Doyle, B. L. W. Chapman, G. Balckwell, E. G. Walsh, G. M. Pohost, "Adaptive Fourier Filtering: Artifact Reduction in High Resolution Cardiac Images," Proc. SMRM, 11th Annual Meeting, Berlin, 1992, in column direction of the medical image. And finally, as indicated at process block 217, an inverse one-dimensional discrete wavelet transform (1D DWT) is performed in the row direction. The FTF step 216 is employed to increase the effectiveness of the DWT. The FTF step 216 removes incoherence in the correlated data, and since the DWT breaks the image data into sub-bands which are sparse versions of the original image data, the FTF corresponds to filtering the artifacts according to the extent of the incoherence the artifacts produce in a particular sub-band.

The filter parameters used in the three step filter 212 can be set to aggressively reduce or eliminate the streak artifacts from the filtered image. Although such aggressive filtering may also blur edges in the medical image, as will become apparent below, this is of little concern to the ultimate output.

Figure 5:
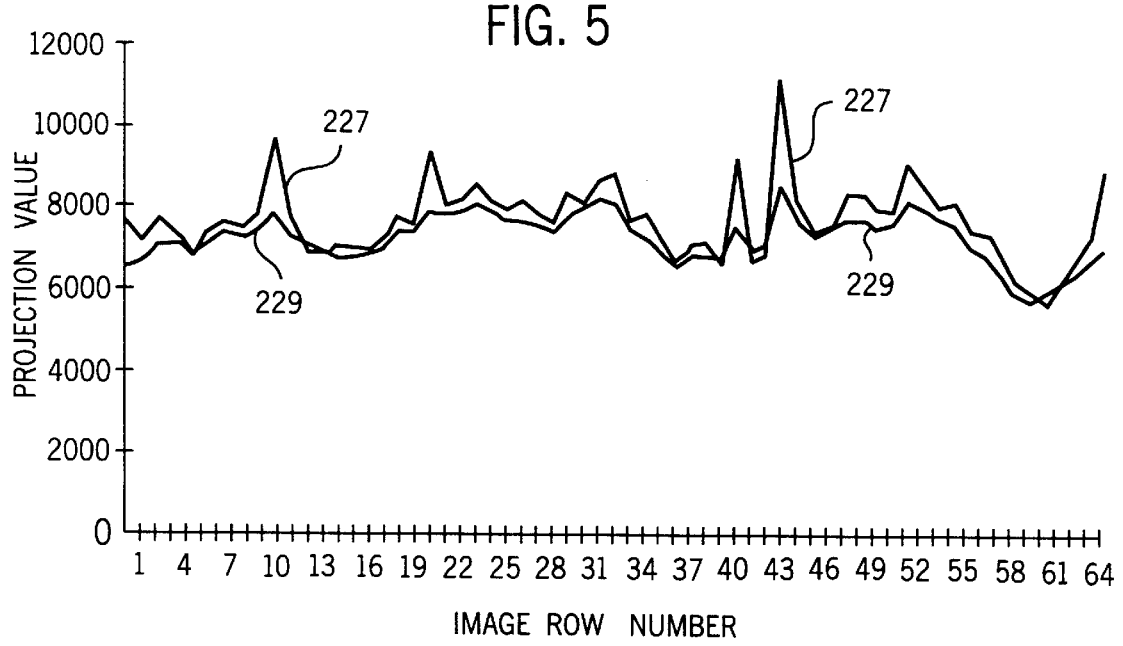
FIG. 5 is a graphic representation of row projections which are calculated as part of the process in FIG. 4.

As indicated at process block 220, the next step is to locate those rows in the original medical image that contain streaks. This can be accomplished in many ways, but in the preferred embodiment it is done by comparing the original medical image with the filtered copy. This can be accomplished in many ways. As indicated by dashed lines 222, in the preferred embodiment of the invention this comparison is performed in a four step process. First, the original image is projected in the row direction as indicated at process block 224. The same projection is then performed on the filtered image at process block 226. These projections are simply the sum of all the pixel intensities in each row, and since the streaks are in the row direction, the projection value of rows in the original image with streaks will be much greater than the projection value of the corresponding row in the filtered image. This is illustrated in FIG. 5, where graph 227 is the row projection of the original image and graph 229 is the row projection of the filtered image. By subtracting corresponding values in the two projections 227 and 229 at process block 228, the rows containing streaks can be identified. Those rows with the largest difference in projection values contain the strongest streaks, and by sorting the difference values in descending order as indicated at process block 230, the rows can be ordered, or prioritized, with the rows containing the strongest streak artifacts listed first.

As indicated at process block 234, the last step in the process is to replace the rows containing streaks in the original medical image with filtered rows. This can be as simple as selecting rows indicated in the priority list from the filtered image and writing them into the corresponding rows of the original medical image. In the preferred embodiment, however, a more complex process indicated by dashed lines 236 is employed for this purpose.

Referring still to FIG. 4, a loop is entered in which the highest priority row is selected at process block 240 from the list produced at process block 230. A replacement row is then produced at process block 242 by combining in a weighted average the corresponding row in the filtered image with corresponding adjacent rows from the original medical image. For example, if the row n is to be produced, the pixel values $f_n$ from the $n^{th}$ row of the filtered image are combined with the pixel values $I_{n-1}$ and $I_{n+1}$ from the adjacent rows of the original image to produce the replacement row of pixel values $I_n$:

$I_n = (f_n + I_{n-1} + I_{n+1})/3$;

$I_n = (f_n + I_{n+1})/2$ if n=first row; and $I_n = (f_n + I_{n-1})/2$ if n=last row.

As indicated at process block 244, the replacement row of values $I_n$ is then written into the $n^{th}$ row of the final image. This replacement of rows of pixel values continues until a preselected number of rows have been changed as determined at decision block 246. The number of rows to be replaced is a filter parameter input by the user at process block 204. It is usually set equal to the number of visible streaks seen in the original image.

When the rows containing streaks have been replaced the process exits at 250. The user may examine the displayed image and decide that further removal of streaks is required. In this case the entire process is repeated on the original medical image, but the user inputs a higher number of rows to be replaced on the next pass. In this manner the minimal number of rows can be replaced to remove the objectionable streaks, without affecting the remaining rows in the medical image.

In an alternative embodiment of the invention the rows in the image containing streak artifacts are located without producing a filtered copy of the original image. Referring particularly to FIG. 4, in this embodiment of the invention the process block 210 is not required and the process block 220 is changed to perform the following steps. First, each row of the original image is projected as described above with respect to process block 224. Each such projection $P_n$ of the $n^{th}$ row is the sum of the pixel values in that row. Then a sliding window is used to examine these projections and locate the streaks. More specifically, either a 3-row or 5-row sliding window compares the value of each projection $P_n$ with the average value of surrounding projections (i.e. $P_{n-1}$ and $P_{n+1}$ for 3-row window, and $P_{n-1}$, $P_{n-2}$, $P_{n+1}$ and $P_{n+2}$ for 5-row window). The output of the sliding window will be higher for rows containing streaks:

output=$P_n - (P_{n-1} + P_{n+1})/2$ for a 3-row window;

output=$P_n - (P_{n-2} + P_{n-1} + P_{n+1} + P_{n+2})/4$ for a 5-row window;

These output values can be sorted as described above for process block 230 and used to replace the highest priority rows as described above for process block 234.

We claim:

1. In a medical imaging system a method for removing streak artifacts that extend along the row direction from an image comprised of a plurality of rows of pixels indicating brightness, the steps comprising:

locating rows of pixels in the image based on brightness values that indicate streak artifacts therein; and removing the steaks artifacts by replacing all the pixels in each of said located rows of pixels in the image.

2. In a medical imaging system a method for removing streak artifacts that extend along the row direction from an image comprised of a plurality of rows of pixels indicating brightness, the steps compromising:

locating rows of pixals in the image having brightness values that indicate streak artifacts therein by:

producing a filtered copy of the image; and comparing rows in the image with corresponding rows in the filtered copy of the image; and removing the steaks artifacts by replacing located rows of pixels in the image.

3. The method as recited in claim 2 in which the replacement rows of pixels are formed in part from corresponding rows of pixels in the filtered copy.

4. The method as recited in claim 2 in which the rows containing streak artifacts are determined by projecting the pixel values in each row of the image and projecting the pixel values in each row of the filtered copy, and the successive rows are compared by subtracting corresponding projection values to produce corresponding projection difference values.

5. The method as recited in claim 4 in which the projection difference values indicate streak artifacts and they are sorted into a list of rows having descending projection difference values.

6. The method as recited in claim 5 in which the sorted list of rows indicates which rows in the acquired image are to be replaced.

7. The method as recited in claim 5 in which the number of rows in the acquired image to be replaced is manually preset to a selected number and this preset number determines the number of rows from the top of the sorted list of rows which are to be replaced in the acquired image.

8. The method as recited in claim 2 in which the filtered copy is produced using a filter which reduces streak artifacts in the acquired image.

9. In a medical imaging system, a method for removing streak artifacts that extend along the row direction from an image comprised of a plurality of rows of pixels indicating brightness, the steps comprising:

locating rows of pixels in the image having brightness values that indicate streak artifacts therein by producing a filtered copy of the image and comparing rows in the image with corresponding rows in the filtered copy of the image, wherein said step of producing the filtered copy includes steps of performing a discrete wavelet transform along one axis of the image, performing Fourier threshold filtering along another axis of the image and performing an inverse discrete wavelet transform along said one axis of the image; and removing the steaks artifacts by replacing said located rows of pixels in the image.

10. The method as recited in claim 1 in which locating the rows containing streak artifacts is performed by:

projecting each row in the image to form a projection value $P_n$; and comparing the projection value of each row with the average of the projection values in adjacent rows.

11. The method as recited in claim 10 in which comparing is performed using a sliding window that produces output values for each row in the image.

12. The method as recited in claim 11 in which the output values are sorted to indicate the priority with which rows should be replaced.

* * * * *